(12) United States Patent
Fillep et al.

(10) Patent No.: US 11,192,476 B2
(45) Date of Patent: Dec. 7, 2021

(54) VEHICLE SEAT HAVING A RESIDUAL SPRING TRAVEL CONTROLLER

(71) Applicant: GRAMMER AG, Amberg (DE)

(72) Inventors: Johannes Fillep, Birgland (DE); Florian Schanderl, Schwarzenfeld (DE)

(73) Assignee: GRAMMER AG, Ursensollen (DE)

(*) Notice: Subject to any disclaimer, the term of this patent is extended or adjusted under 35 U.S.C. 154(b) by 86 days.

(21) Appl. No.: 16/659,883

(22) Filed: Oct. 22, 2019

(65) Prior Publication Data

US 2020/0122612 A1 Apr. 23, 2020

(30) Foreign Application Priority Data

Oct. 23, 2018 (DE) .......................... 102018126404.6

(51) Int. Cl.
*B60N 2/00* (2006.01)
*B60N 2/52* (2006.01)
*B60N 2/50* (2006.01)
*F16C 1/10* (2006.01)
*G05G 5/05* (2006.01)

(52) U.S. Cl.
CPC ............ *B60N 2/525* (2013.01); *B60N 2/502* (2013.01); *B60N 2/505* (2013.01); *F16C 1/10* (2013.01); *G05G 5/05* (2013.01)

(58) Field of Classification Search
None
See application file for complete search history.

(56) References Cited

U.S. PATENT DOCUMENTS 5,651,585 A * 7/1997 Duser .................... B60N 2/502
248/585
5,799,922 A * 9/1998 Timms ................... B60N 2/501
248/564
(Continued)

FOREIGN PATENT DOCUMENTS

DE 102007012399 8/2008
DE 102007032897 1/2009
(Continued)

OTHER PUBLICATIONS

Official Action for India Patent Application No. 201924042538, dated Dec. 23, 2020, 6 pages.
(Continued)

*Primary Examiner* — Steven M Marsh
(74) *Attorney, Agent, or Firm* — Sheridan Ross P.C.

(57) ABSTRACT

A vehicle seat having a residual spring travel controller and an air spring, the residual spring travel controller and the air spring each having a first end that is connected to a first connecting link of the vehicle seat and each having a second end that is connected to a second connecting link of the vehicle seat, and the residual spring travel controller comprising a piston element that is connected to the first end of the residual spring travel controller and a rod element that is connected to the second end of the residual spring travel controller, it being possible to bring the piston element into contact with a valve element or a switch element by means of a rotary and/or sliding movement with respect to the rod element to adjust an amount of air of the air spring.

20 Claims, 11 Drawing Sheets

(56) References Cited

U.S. PATENT DOCUMENTS

| | | | | |
|---|---|---|---|---|
| 6,120,082 | A * | 9/2000 | Vandermolen | B60N 2/02 248/550 |
| 7,044,553 | B2 * | 5/2006 | Ropp | B60N 2/508 297/313 |
| 7,413,158 | B1 * | 8/2008 | Burer | B60N 2/42736 248/421 |
| 9,694,727 | B2 * | 7/2017 | Haller | B60N 2/165 |
| 2004/0159763 | A1 * | 8/2004 | Mullinix | B60N 2/062 248/421 |
| 2006/0278805 | A1 * | 12/2006 | Haller | B60N 2/502 248/588 |
| 2011/0290978 | A1 * | 12/2011 | Keen | B60N 2/501 248/421 |

FOREIGN PATENT DOCUMENTS

| | | |
|---|---|---|
| DE | 102008005829 | 7/2009 |
| DE | 102010022959 | 12/2011 |

OTHER PUBLICATIONS

Official Action for German Patent Application No. 102018126404. 6, dated Jun. 19, 2019, 3 pages.
Extended Search Report for European Patent Application No. 19203556.6, dated Mar. 18, 2020, 3 pages.
Official Action with Machine Translation for German Patent Application No. 102018126404.6, dated Nov. 2, 2020, 4 pages.

* cited by examiner

H-H

O-O

P - P

VEHICLE SEAT HAVING A RESIDUAL SPRING TRAVEL CONTROLLER

CROSS-REFERENCE TO RELATED APPLICATIONS

This application claims the benefit of German Patent Application No. DE 10 2018 126 404.6 filed Oct. 23, 2018, the entire contents of which are incorporated herein by reference.

FIELD

The present invention relates to a vehicle seat having a residual spring travel controller and an air spring, the residual spring travel controller and the air spring each having a first end that is connected to a first connecting link of the vehicle seat and each having a second end that is connected to a second connecting link of the vehicle seat, and the residual spring travel controller comprising a piston element that is connected to the first end of the residual spring travel controller and a rod element that is connected to the second end of the residual spring travel controller.

BACKGROUND

Residual spring travel adjustments are known from the prior art in which the spring or the damper, which is usually connected on the one hand to an oscillating element and a non-oscillating element of the vehicle seat, is adjusted by means of a fluidic adjustment within the respective element. In the case of a damper, for example, the piston is driven further out or driven further in by means of a pressure change in the working chamber.

However, such residual spring travel adjustments are complicated and also interfere with the operation of other parameters, such as damping or suspension or height adjustment.

SUMMARY

The object of the present application is therefore to provide a vehicle seat having a residual spring travel adjustment device, by means of which a seat height of the vehicle seat can be adjusted particularly easily.

The basic idea of the present application is therefore to provide a vehicle seat having a residual spring travel controller and an air spring, the residual spring travel controller and the air spring each having a first end that is connected to a first connecting link of the vehicle seat and each having a second end that is connected to a second connecting link of the vehicle seat, and the residual spring travel controller comprising a piston element that is connected to the first end of the residual spring travel controller and a rod element that is connected to the second end of the residual spring travel controller, it being possible to bring the piston element into contact with a valve element or a switch element by means of a rotary and/or sliding movement with respect to the rod element to adjust an amount of air in the air spring.

It is conceivable for the first connecting link and the second connecting link to form a scissor frame, i.e., to be arranged correspondingly in crossing manner and to be rotatable about a common axis of rotation. Alternatively, it is conceivable that the connecting links are arranged such that a parallelogram linkage is possible.

By changing the amount of air in the air spring, the seat height of the vehicle seat can be adjusted to adapt the vehicle seat to the needs of a person who has sat down on the vehicle seat.

In particular, the piston element can be connected to the first end of the residual spring travel controller so as to be rotatable about a first axis of rotation.

More preferably, the rod element can be immovably connected to the second end of the residual spring travel controller.

According to the invention, the piston element is rotatable and/or displaceable relative to the rod element. This also means that the distance between the first end of the residual spring travel controller and the second end of the residual spring travel controller can be changed by moving the piston element in the direction of extension of the rod element.

Depending on the position of the piston element in the direction of the rod element and depending on the angular position of the piston element with respect to the rod element, the piston element can be brought into contact with the valve element or the switch element.

Particularly preferably, the valve element and the switch element are connected to the second end of the residual spring travel controller, that is to say that the piston element moves relative to the valve element and the switch element.

According to a particularly preferred embodiment, the switch element is designed and provided for actuating an air conveying unit for conveying air into the air spring and the valve element is designed and provided to allow air to escape from the air spring.

The valve element is particularly preferably connected to the air spring in a fluidic manner.

According to a further preferred embodiment, the piston element comprises a first functional region and a second functional region, it being possible to bring the first functional region into contact with the switch element and the second functional region into contact with the valve element as a function of an angular position and a longitudinal position of the piston element relative to the rod element.

The first functional region and the second functional region are arranged on the piston element in such a way that either the switch element or the valve element can be contacted; no contacting of the switch element and the valve element is provided because a simultaneous supply and discharge of air of the air spring is not expedient.

According to a further preferred embodiment, a first latching pawl and a second latching pawl are arranged at the second end of the residual spring travel controller, it being possible to lock the first functional region by means of the first latching pawl and the second functional region by means of the second latching pawl with respect to a rotation of the piston element.

If the first functional region is locked by means of the first latching pawl, the first functional region is also particularly preferably in contact with the switch element. Likewise particularly preferably, the second functional region is in contact with the switch element if the second functional region is locked by means of the second latching pawl.

In particular, a locking of the piston element with respect to the rotational movement is particularly advantageous in order to move the vehicle seat into a specific position or state of the vehicle seat.

Particularly preferably, a spring travel is assigned to the vehicle seat depending on the nature of the air spring. For example, this spring travel is 180 mm in total, a minimum spring travel of 50 mm being provided. This minimal spring travel corresponds to the residual spring travel, in each case in a downward direction and in an upward direction. A normal range is provided between the residual spring travels of 50 mm, wherein said normal range can be used to adjust the seat height according to the person's requirements. In the present example, the normal range is 80 mm.

According to a particularly preferred embodiment, a lower residual spring travel range and an upper residual spring travel range as well as a normal range of the vehicle seat arranged between the lower and the upper residual spring travel range are provided, the first functional region being in contact with the switch element by means of a rotation of the piston element when the vehicle seat is in the lower residual spring travel range, and it being possible to bring the second functional region into contact with the valve element by means of a rotation of the piston element when the vehicle seat is in the upper residual spring travel range.

The residual spring travel range means that the seat height of the vehicle seat is in the lower minimum spring travel of up to 50 mm or in the upper minimum spring travel of 130 mm to 180 mm.

When the person sits down on the vehicle seat, the person can briefly actuate the residual spring travel controller, which corresponds to a rotation of the piston element. If the seat height of the vehicle seat is located in one of the residual spring travels, the piston element is locked by means of the respective latching pawl because of the configuration of the piston element and the seat height is automatically changed to the normal range by contacting the switch element or the valve element. If the seat height reaches the normal range, the lock is released by the corresponding latching pawl by way of the longitudinal displacement of the piston element such that the piston element moves back to a zero position. Zero position means that neither the valve element nor the switch element is being contacted. The resetting of the piston element will be illustrated in greater detail below.

According to a particularly preferred embodiment, an actuating element for actuating the residual spring travel controller is provided, a first Bowden cable and a second Bowden cable being connected to the actuating element on the one hand and to the piston element on the other hand.

Particularly preferably, the first Bowden cable transmits a pull to the piston element to rotate the piston element to the right or to the left upon actuation of the actuating element in a first direction, the second Bowden cable transmitting a pull to the piston member to rotate the piston member to the left or to the right in the corresponding other direction upon actuation of the actusting element in a second direction.

It is thus provided, for example, that the piston element is rotated to the right by actuating the actuating element up, which corresponds to a seat height increase. Upon downward actuation of the actuating element, which corresponds to a seat height decrease, the piston element is rotated in the corresponding other direction, i.e., to the left. The reverse directions are also possible.

In this case, a transmission of a pull to the piston element by the corresponding Bowden cable means that the Bowden cable transmits a tensile force to the piston element by way of actuation of the actuating element, as a result of which the piston element undergoes a rotation.

According to a further particularly preferred embodiment, the actuating element comprises a return spring to return the actuating element to a zero position of the actuating element following actuation.

The zero position means, in particular, that no force acts upon the return spring, which would result in a restoring force of the return spring. This also means that the actuating element is not actuated such that no tensile force transmission to the piston element by one of the Bowden cables is provided.

Particularly preferably, the return spring is designed as a leg spring. More preferably, the leg spring is designed in such a way that the legs of the leg spring are parallel to each other in the zero position.

According to a further preferred embodiment, the first functional region comprises a first functional region portion and a second functional region portion, it being possible to bring the first functional region portion into contact with the switch element and the second functional region portion into contact with the second latching pawl.

As a result, a contacting of the piston element with the switch element or the second latching pawl is easily possible, wherein said contacting is as defined as possible.

Further advantageously, the first functional region portion and the second functional region portion extend in the extension direction of the piston element or the rod element. Further advantageously, an extension length of the first functional region portion is smaller than the extension length of the second functional region portion.

Due to the different extension lengths of the functional region portions, good actuation of the switch element as well as good locking by the latching pawl and corresponding residual spring travel actuation are possible, especially if the lengths of the functional region portions are adapted to the residual spring travels and the normal range.

According to a further preferred embodiment, the second functional region has a first functional region portion and a second functional region portion, it being possible to bring the first functional region portion into contact with the valve element and the second functional region portion into contact with the first latching pawl.

As a result, a contacting of the piston element with the valve element or the first latching pawl is easily possible, wherein said contacting is as defined as possible.

Further advantageously, the first functional region portion and the second functional region portion of the second functional region extend in the extension direction of the piston element or the rod element. Further advantageously, an extension length of the first functional region portion is smaller than the extension length of the second functional region portion.

Due to the different extension lengths of the functional region portions, good actuation of the valve element as well as good locking by the latching pawl and corresponding residual spring travel actuation are possible, especially if the lengths of the functional region portions are adapted to the residual spring travels and the normal range.

According to a further preferred embodiment, the first latching pawl and the second latching pawl are spaced apart from one another at a first distance as seen in the extension direction of the rod element. By spacing the latching pawls apart from one another, the piston element can have a particularly clear design with regard to the functional regions and the switch element and the valve element can be arranged in the vicinity of the respective latching pawl.

Particularly advantageously, the first functional region portion of the first functional region has a first length and the second functional region portion of the first functional region has a second length as seen in the extension direction of the piston element or the rod element.

Likewise advantageously, the first functional region portion of the second functional region has a first length and the second functional region portion of the second functional region has a second length as seen in the extension direction of the piston element or the rod element.

The underlying object is also achieved by a method for operating the vehicle seat having a residual spring travel controller, comprising the following method steps:
   a) actuating the residual spring travel controller;
   b) depending on a position of the piston element relative to the rod element:
      b1) extending the residual spring travel controller from a lower residual spring travel range to a normal range;
      b2) extending the residual spring travel controller from an upper residual spring travel range to a normal range;
      b3) setting a height of the vehicle seat in the normal range.

Before method step a), it is also advantageous if a person sits down on the vehicle seat, that is, if the vehicle seat is occupied. Depending on their size and weight, the person may desire a different seat height than previously set and will therefore actuate the residual spring travel controller.

An actuation of the residual spring travel controller, for example by means of the actuating element, results in a rotation of the piston element, thus making different options for further travel possible depending on the position of the piston element relative to the rod element.

If the vehicle seat is located in the lower residual spring travel range, that is, if the possible downward spring travel is less than, for example, 50 mm, the first functional region locks with the second latching pawl due to the rotation of the piston element due to the actuation and is in contact with the switch element such that air can be conveyed into the air spring. As a result, the residual spring travel controller is extended, that is, that the piston element is displaced in the extension direction relative to the rod element. In this case, the piston element is extended as long as there is a lock with the second latching pawl in the direction of rotation. As a result of the extension movement, the second functional region portion of the first functional region is locked by the second latching pawl until the length of the functional region has been travelled along.

If the vehicle seat is in the upper residual spring travel range, that is, if the possible upward spring travel is less than, for example, 50 mm, the second functional region locks with the first latching pawl due to the rotation of the piston element due to the actuation and is in contact with the valve element such that air can be discharged from the air spring. As a result, the residual spring travel controller is extended, that is to say that the piston element is displaced in the extension direction relative to the rod element, namely in the direction opposite the one in the lower residual spring travel range. In this case, the piston element is extended as long as there is a lock with the first latching pawl in the direction of rotation. As a result of the extension movement, the second functional region portion of the second functional region is locked by the first latching pawl until the length of the functional region has been travelled along.

After the corresponding functional region portion has been travelled along and the lock has been released with the corresponding latching pawl, the vehicle seat is in the normal range.

If the vehicle seat is in the normal range, the seat height of the vehicle seat can be adjusted by actuating the residual spring travel controller until the seat height of the vehicle seat enters the lower or upper residual spring travel range.

Further advantageous embodiments result from the dependent claims.

BRIEF DESCRIPTION OF THE DRAWINGS

Additional objects, advantages and expedient uses of the present invention can be found in the following description in conjunction with the corresponding drawings. In the drawings.

DETAILED DESCRIPTION

Figure 1:
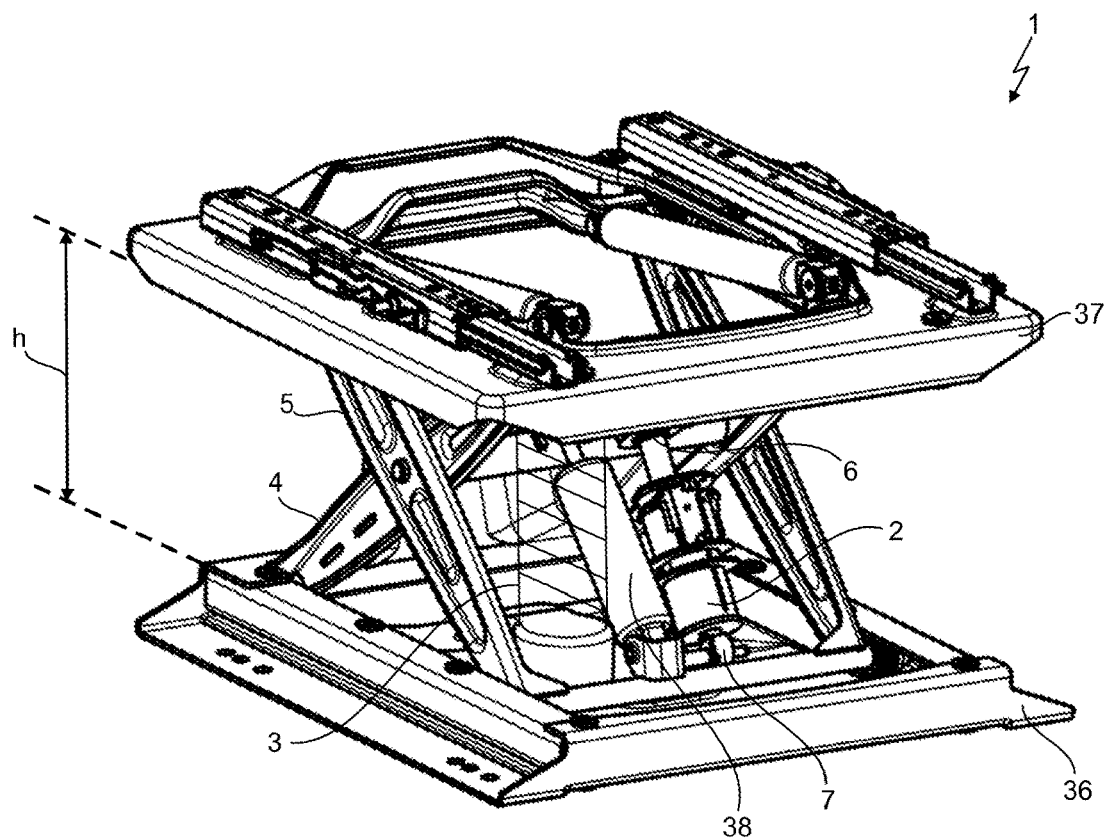
FIG. 1 shows a vehicle seat having a residual spring travel controller.

In the figures, the same components are denoted by the same reference numerals, it being possible for the reference numerals to be omitted in some figures for clarity.

FIG. 1 shows a vehicle seat 1, at least in parts, with a residual spring travel controller 2. In this case, a lower part 36 and an upper part 37 are provided that are connected to each other by means of a first connecting link 4 and a second connecting link 5. A first end 6 of the residual spring travel controller 2 is connected to the first connecting link 4 and a second end 7 of the residual spring travel controller 2 is connected to the second connecting link 5.

Furthermore, a damper 38 is preferably provided for damping movements of the upper part 37 relative to the lower part 36, which is also connected to the first connecting link 4 and the second connecting link 5. The damper 38 and the residual spring travel controller 2 are arranged parallel to each other.

Likewise, an air spring 3 is provided that is connected to the upper part 37 and the lower part 36 to change a seat height h. The seat height h can, for example, be defined by the distance between the upper part 37 and the lower part 36.

The residual spring travel controller 2 controls an amount of air in the air spring 3, it being possible to either increase or decrease the amount of air.

The design of the residual spring travel controller 2 and its operation will be described in greater detail with reference to the further figures.

Figure 2A:
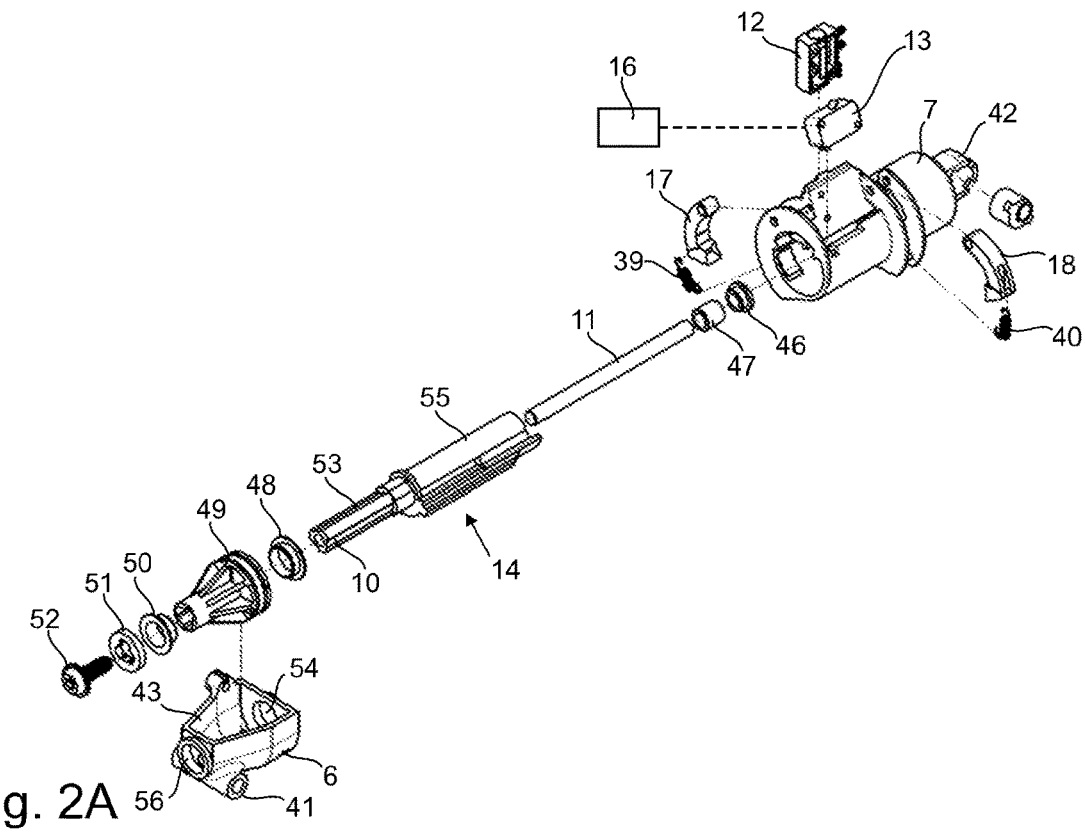
FIG. 2A shows an exploded view of the residual spring travel controller according to an embodiment.

FIG. 2A shows a residual spring travel controller 2 according to a particularly preferred embodiment and in an exploded view.

As can be seen, the residual spring travel controller 2 has a first end 6 and a second end 7, a rod element 11 being immovably connected to the second end 7. Furthermore, a piston element 10 is provided that is rotatably and slidably mounted with respect to the rod element, the piston element 10 being rotatably connected to the first end 6 of the residual spring travel controller 2. In particular, the piston element 10 has a shaft part 53 that extends through a first opening 54 of the first end 6 and is rigidly connected to a rotary body 49. Furthermore, a functional body part 55 of the piston element 10 is provided that adjoins the shaft part 53 and has the first functional region 14 and the second functional region 15, only the first functional region 14 being shown in FIG. 2A. To prevent the functional body part 55 from jamming with the first end 6 of the residual spring travel controller 2, a second slide bush 48 is provided that surrounds the shaft part 53 and is in contact with the functional body part 55 and the first opening 54. The rotary body 49 is inserted into a receptacle 43 of the first end 6 of the residual spring travel controller 2.

Furthermore, a third slide bush 50 is provided that can be connected to the rotary body 49 and that is also arranged within the receptacle 43. In addition, a fourth spacer element 51 is provided that is arranged outside the receptacle 43 and is in contact with a screw 52. The screw is arranged such that it extends through a second opening 56 of the receptacle 43 for the rotational fixation of the rotary body 49 and is connected to the rotary body 49.

Likewise, the first end 6 of the residual spring travel controller 2 has a first fastening eye 41, by means of which the first end 6 is connected to the first connecting link 4.

In contrast, a slide bush 46, which is preferably configured with a collar, is provided, by means of which wear during translational and/or rotational movements can be reduced. Particularly preferably, the rod element 11 is pressed firmly into the second end 7. In addition, a first slide bush 47 can be seen that surrounds the rod element 11 and limits the movement of the piston element 10 in the extension direction of the rod element 11 with respect to the rod element 11.

In particular, the slide bushes 46, 48, 50 also have a collar and are used to reduce wear during translational and/or rotational movements.

A first latching pawl 17 and a second latching pawl 18, which are provided for locking the piston element 10, are in particular rotatably connected to the second end 7. The precise operation is shown in greater detail in the other figures. The first latching pawl 17 is connected to the second end 7 so as to be rotatable about a first axis of rotation 44 and the second latching pawl 18 is connected to said second end so as to be rotatable about a second axis of rotation 45.

A valve element 12 and a microswitch 13 are also connected to the second end 7, the microswitch 13 being connected to actuate an air conveying unit 16. Upon activation of the microswitch 13, a signal is sent to the air conveying unit 16 to increase the amount of air in the air spring 3. The air conveying unit 16 is in fluidic contact with the air spring 3.

A second fastening eye 42 is also provided at the second end 7 of the residual spring travel controller 2, by means of which the residual spring travel controller 2 is connected to the second connecting link 5.

The first latching pawl 17 is also connected to a first spring element 39, the first spring element 39 also being connected to the second end 7 of the residual spring travel controller 2. The second latching pawl 18 is connected to a second spring element 40, the second spring element 40 being connected to the second end 7 of the residual spring travel controller 2. Upon rotation of a latching pawl 17, 18, a restoring force is generated by the respective spring element 39, 40, which restoring force acts to return the latching pawl 17, 18 to its initial position. A deflection of a latching pawl 17, 18 is a consequence of the locking of the piston element 10.

Figure 2B:
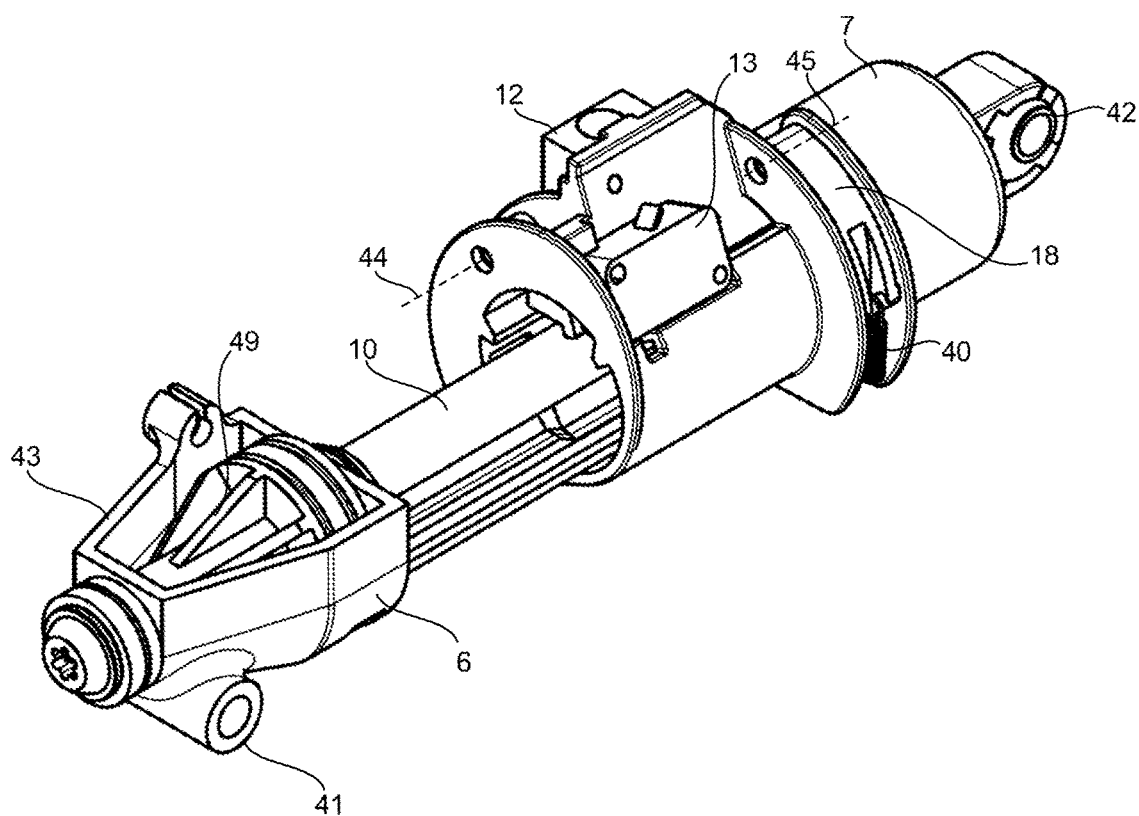
FIG. 2B shows an assembled view of the residual spring travel controller according to FIG. 2A.

FIG. 2B shows the residual spring travel controller 2 of FIG. 2A in the assembled state.

Figure 3A:
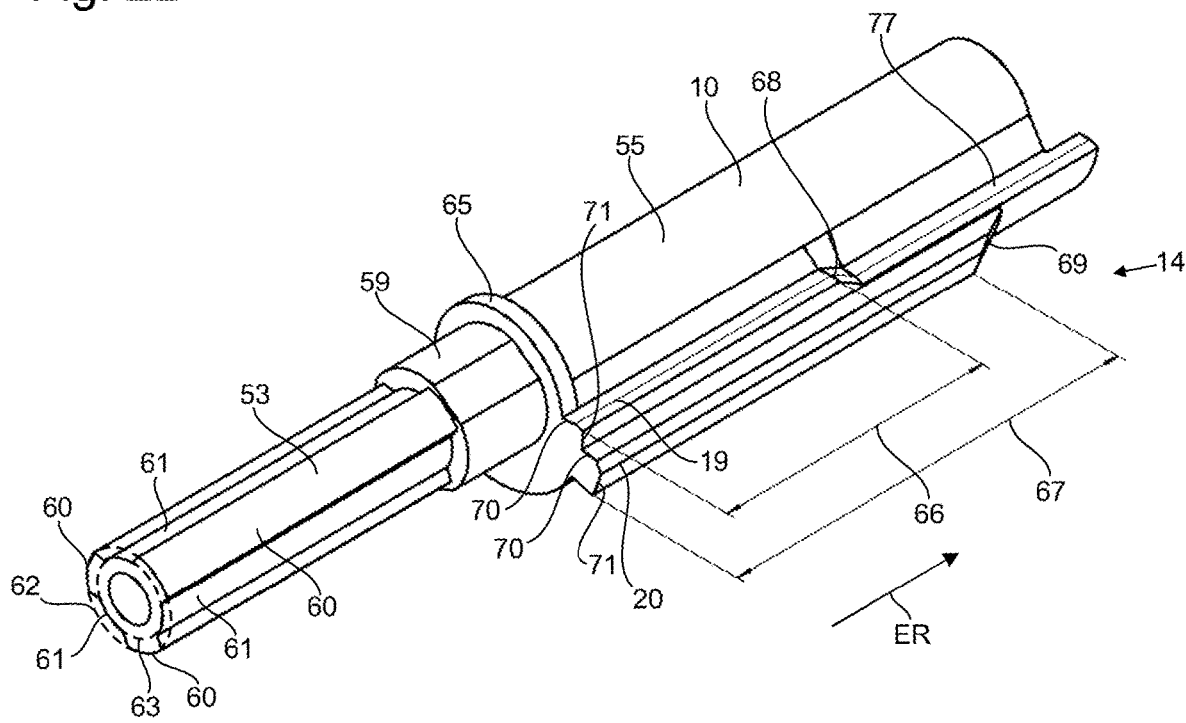
FIG. 3A shows a perspective view of the piston element.
Figure 3B:
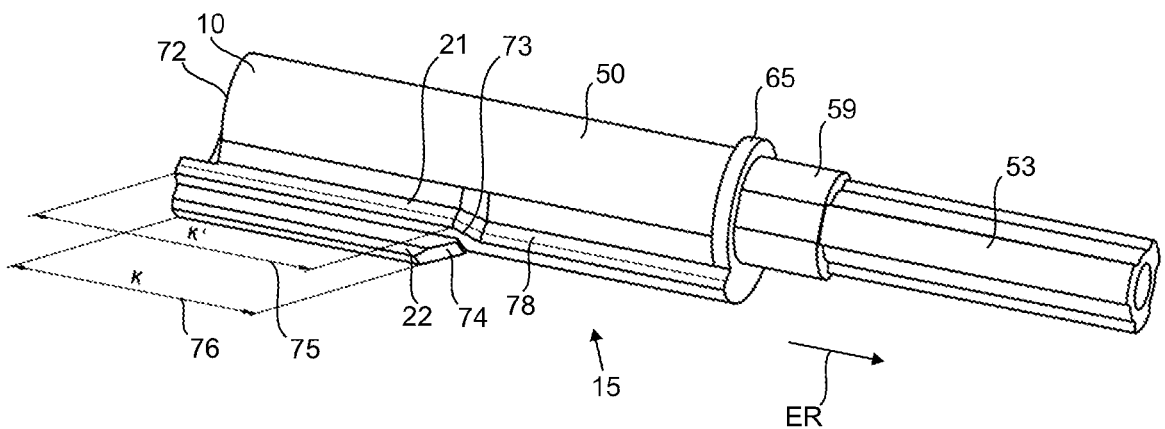
FIG. 3B shows a further perspective view of the piston element.

In FIGS. 3A and 3B, the piston element 10 of the residual spring travel controller 2 is shown in greater detail, FIG. 3A being a first perspective view and FIG. 3B being a second perspective view.

FIG. 3A shows the piston element 10 of the residual spring travel controller 2 with a first functional region 14 that has a first functional region portion 19 and a second functional region portion 20.

The first functional region 14 is arranged on a portion of the piston element 10 that is referred to as a functional body part 55. Likewise, the second functional region 15 having the corresponding first functional region portion 21 and the second functional region portion 22 is arranged on the functional body part 55, as can be seen in FIG. 3B.

Furthermore, the piston element 10 also comprises a shaft part 53 whose function has already been described. In a more detailed refinement, the shaft part 53 has first portions 60 and second portions 61, the first portions 60 being located on a first circle 62 and the second portions 61 being located on a second circle 63, a radius of the first circle 62 being greater than a radius of the second circle 63. This design makes a rotation-proof connection to the rotary body 49 possible. The rotary body 49 has a receptacle 64 (not shown here) of the rotary body 49 that is designed at least in part to be complementary to the shaft part 53.

The piston element 10 also comprises a transition region 59 that is arranged between the shaft part 53 and the functional body part 55. The transition region 59 is provided and designed to receive the second slide bush 48 in a rotation-proof manner. The transition region 59 can also be connected to the rotary body 49 at least in part. The receptacle 64 of the rotary body 49 is designed accordingly. Overall, the receptacle 64 of the rotary body is preferably designed to receive the shaft part 53 and, at least in part, the transition region 59.

In particular, the transition region 59 serves as a rotary bearing, in particular in combination with the slide bush 48, which is pressed into the first opening 54 of the first end 6. The result is therefore that the first end 6 is rigidly connected to the slide bushes 48, 50, the piston element 10 thereby being rotatably mounted with respect to the first end 6.

A first end face 65 that faces the transition region 59 is provided on the functional region 55. In this case, the first end face 65 serves as an end stop of the movement of the first end 6 relative to the second end 7, preferably in conjunction with the second slide bush 48 (not shown here).

As already mentioned above, the functional body part 55 has the first functional region 14 having the functional region portion 19 and the second functional region portion 20. The functional region portions 19, 20 start at the first end face 65 and extend in the extension direction ER of the piston element 10 or the rod element 11. In a plan view of the first end face 65, the functional region portions 19, 20 are designed in such a way that they are step-shaped, that is to say that in each case a proportion of the functional region portions 19, 20 is arranged in the radial direction of the first end face 65 and a further proportion of the functional region portions 19, 20 is arranged to extend substantially perpendicular to the proportion.

The functional region portions 19, 20 extend in the extension direction ER starting from the first end face 65, a length 66 of the first functional region portion 19 being smaller than a length 67 of the second functional region portion 20.

As already mentioned above, the first functional region portion 19 extends with the length 66 in the direction of extent ER starting from the end face 65. The same applies to the second functional region portion 20, with the length 67 in the extension direction ER. After reaching the length 66, the first functional region portion 19 ends because a first tapered region is provided following the first functional region portion 19. The same applies to the second functional region portion 20 having a second tapered region 69.

The first tapered region 68 is designed such that the further proportion 71 of the first functional region portion 19 tapers. The second tapered region 69 is configured in such a way that the proportion 70 of the second functional region portion 20 tapers.

FIG. 3B shows the piston element 10 of FIG. 3A in a further perspective view, in the present case rotated by 90°. The second functional region 15 having the associated first functional region portion 21 and the second functional region portion 22 can now be seen. As can be seen in FIG. 3B, the first functional region portion 21 and the second functional region portion 22 no longer start at the first end face 65, but at a second end face 72 that preferably also defines an end of the piston element 10. The length of the first functional region portion 21 is longer than the length of the second functional region portion 22 as seen in the extension direction ER.

Likewise, a third tapered region 73 and a fourth tapered region 74 are provided that adjoin the respective functional region portions 21, 22. The third tapered region 73 is designed similarly to the first tapered region 68 and the fourth tapered region 74 is designed similarly to the second tapered region 69.

Because of the design of the first tapered region 68 and the third tapered region 73, it is possible for the associated first functional region portions 19, 21 to continue to be contacted with the switch element or the valve element in order to adjust the seat height h in the normal range.

The first functional region portions 19, 21 contact either the switch element or the valve element, whereas the second functional region portions 20, 22 cause locking with one of the latching pawls 17, 18.

The lengths 67, 76 of the second functional region portions 20, 22 are designed in such a way that, after the end of the lengths 67, 76 is reached, the lock having the corresponding latching pawl 17, 18 is released by way of displacement of the piston element 10 relative to the rod element 11. The lock is released because there is no longer any engagement between the second functional region portions 20, 22 and the corresponding latching pawl 17, 18 because of the corresponding tapered region 69, 75.

Following the first functional region portions 19, 21, a first connection region 77 and a second connection region 78 are accordingly provided, by means of which the piston element 10 can be brought into contact with the switch element or with the valve element.

FIGS. 4A to 4E show the residual spring travel controller 2 in various representations.

Figure 4A:
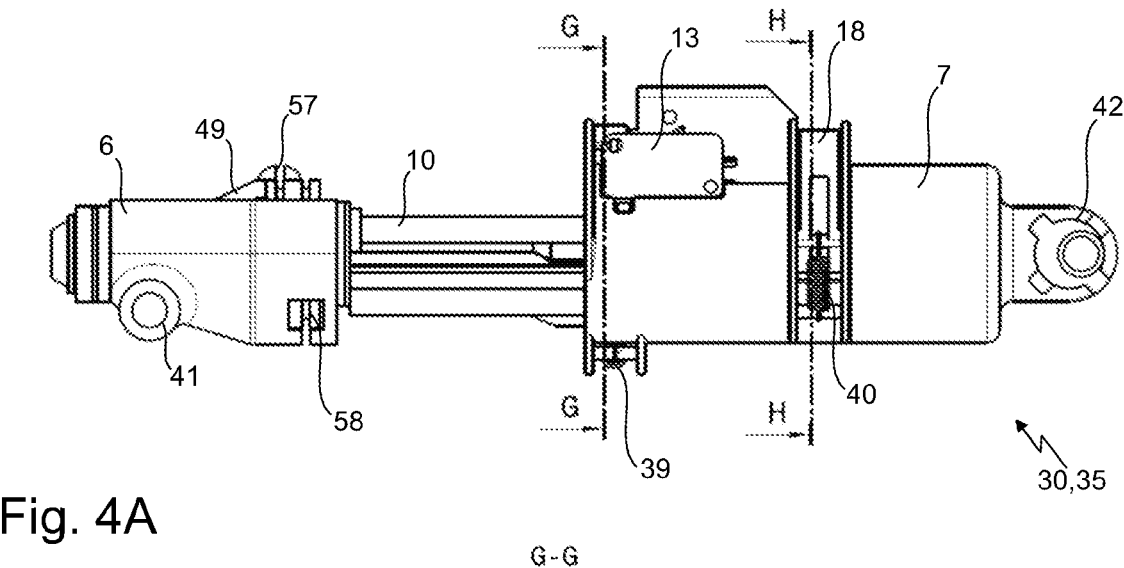
FIG. 4A shows a side view of the residual spring travel controller.
Figure 4B:
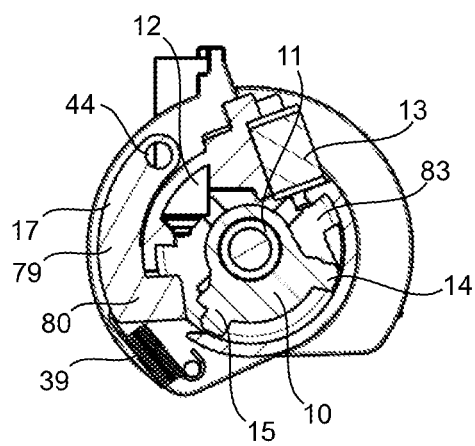
FIG. 4B shows a section of the residual spring travel controller.
Figure 4C:
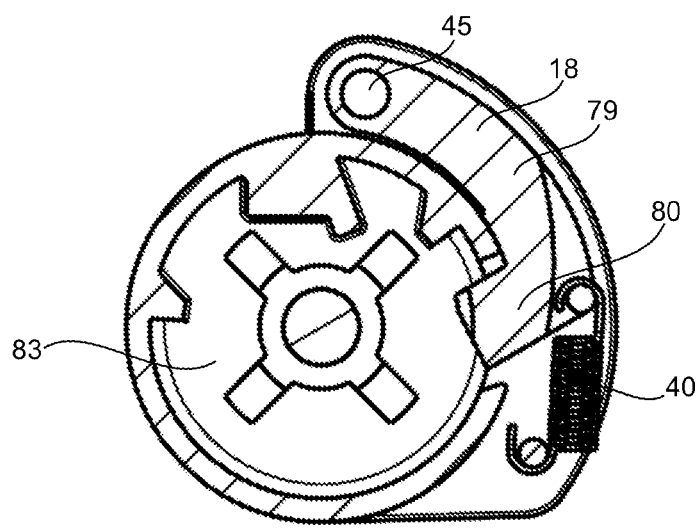
FIG. 4C shows another section of the residual spring travel controller.
Figure 4D:
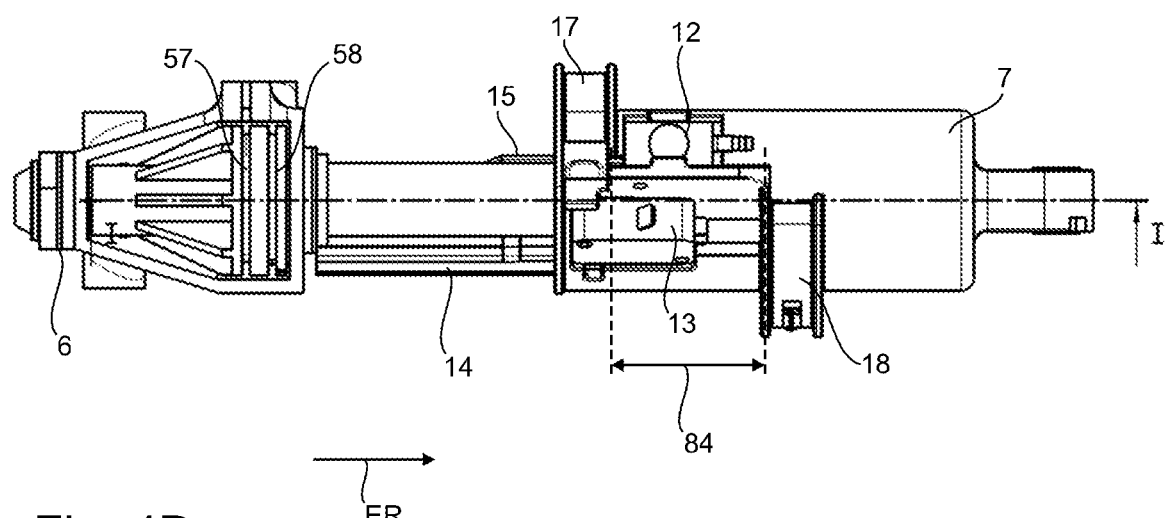
FIG. 4D shows a plan view of the residual spring travel controller.
Figure 4E:
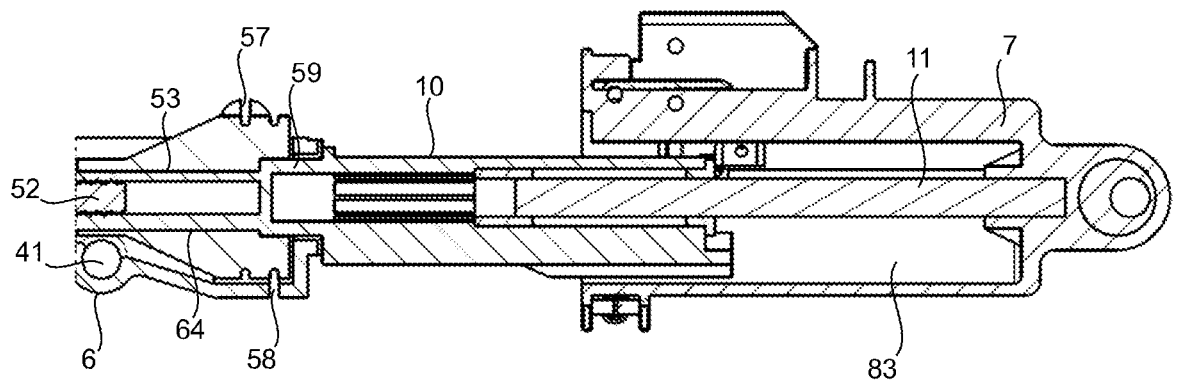
FIG. 4E shows another section of the residual spring travel controller.

FIG. 4A shows a side view of the residual spring travel controller 2, FIG. 4B shows a section along the line G-G, FIG. 4C shows a section along the line H-H, FIG. 4D shows a plan view and FIG. 4E shows a section along the line I-I.

In particular, FIGS. 4A to 4E show the residual spring travel controller in a zero position, that is to say that neither the valve element 12 nor the switch element 13 is contacted by means of the piston element 10.

It can also be seen here that the rotary body 49 has a first Bowden cable receptacle 57 and a second Bowden cable receptacle 58, the function of which will be described in connection with the actuating element.

As already mentioned, the residual spring travel controller 2 is located in the normal range 30, that is to say that it is not possible to lock the piston element 10. It is, however, possible to contact the piston element 10 with the switch element 13 or the valve element 12 to adjust the seat height h in the normal range 30.

The cross sections of FIGS. 4B and 4C show the respective positions of the piston element 10 in greater detail.

FIG. 4B shows the cross section along the line G-G, the piston element 10 being in contact neither with the valve element 12 nor with the switch element 13. The piston element 10 is thus in the zero position 35. Likewise, no locking of the piston element 10 by means of one of the latching pawls 17, 18 is provided.

The latching pawls 17, 18 are designed in a similar manner. The latching pawls 17, 18 each comprise a curved portion 79 that is connected to the second end 7 so as to be rotatable about the first axis of rotation 44 and about the second axis of rotation 45. Furthermore, the latching pawls 17, 18 each comprise a straight portion 80 that is connected to the curved portion 79 and extends through a third opening 81 and a fourth opening 82 of the second end 7, respectively, into an interior 83 in the second end 7 so as to be brought into contact with the piston element 10. The interior 83 is substantially cylindrical here. In this case, the functional regions 14, 15 extend to such an extent that the functional regions 14, 15 are in contact with the latching pawls 17, 18 when the seat height h is in a residual spring travel range 28, 29.

Because of contact with the respective second functional region portion 20, 22, the corresponding latching pawl 17, 18 is pressed outwards and then engages with the second functional region section 20, 22 such that the piston element 10 is locked with respect to the rotation relative to the rod element 11. The engagement of the latching pawl 17, 18 is assisted by the fact that a first spring element 39 or a second spring element 40 is provided that is connected on the one hand to the second end 7 and on the other hand to the latching pawl 17, 18. As a result of the outward pressing of the straight portion 80, the latching pawl 17, 18 is rotated about the respective axis of rotation 44, 45 and retracted again by the spring element 39, 40.

The embodiments of the latching pawls 17, 18 having the spring elements 39, 40 and the piston element 10 in cross section are shown particularly clearly in FIGS. 4B and 4C.

FIG. 4D is a plan view of the residual spring travel controller 2, the latching pawls 17, 18 being arranged at a distance 84 from one another as seen in the extension direction ER. Furthermore, it can be seen that the rotary body 49 has a first Bowden cable receptacle 57 and a second Bowden cable receptacle 58, the Bowden cable receptacles 57, 58 each extending at least in part along the circumference of the rotary body 49.

The spacing of the latching pawls 17, 18 and functional region portions 14, 15 and the design thereof as well as the spacing of the valve element 12 and the switch element 13 allow good actuation and locking, in particular independent locking, of the valve element 12 and the switch element 13 to be ensured.

FIG. 4E shows a section along the line I-I of FIG. 4D. As can clearly be seen here, the receptacle 64 is designed to be complementary to the shaft part 53 and the transition region 59, the transition region 59 being in part received in the receptacle 64.

FIGS. 5A-5C, 6A-6C, 7A-7B and 8A-8B show the operation of the residual spring travel controller 2 again in greater detail.

Figure 5A:
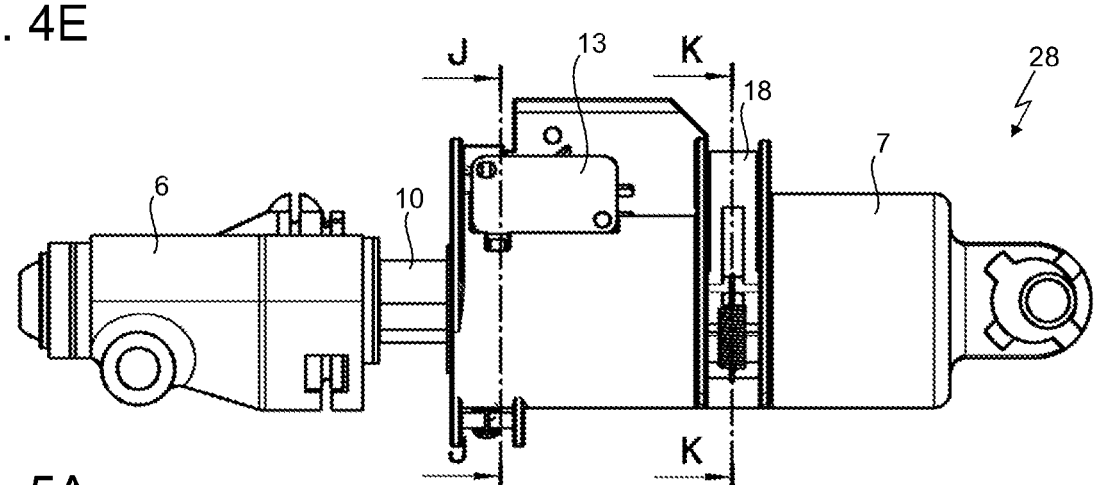
FIG. 5A shows the residual spring travel controller in the lower residual spring travel range.

In FIG. 5A, the seat height h is located in the lower residual spring travel range 28 such that the seat therefore cannot provide sufficient spring travel; the seat is thus too low. According to the embodiment of the residual spring travel controller 2, in particular of the piston element 10, and following an upward actuation of the residual spring travel suspension 2, that is, to adjust the vehicle seat upwardly, the switch 13 is actuated through the first functional region portion 19 of the first functional region 14 by way of the resulting rotation of the piston element 10 and the second functional region portion 20 of the first functional region 14 is locked by the second latching pawl 18. This means that the switch element 13 is actuated as long as the locking of the second functional region portion 20 is maintained.

Figure 5B:
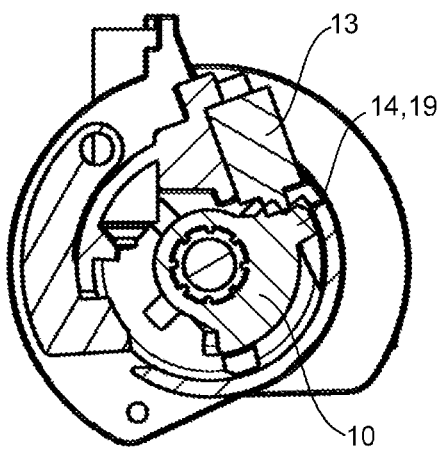
FIG. 5B shows a section of the residual spring travel controller according to FIG. 5A.
Figure 5C:
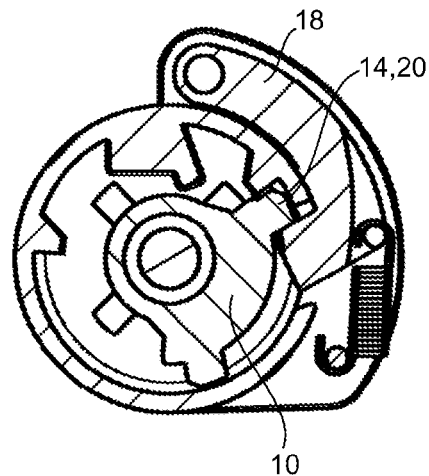
FIG. 5C shows another section of the residual spring travel controller according to FIG. 5A.

FIG. 5B shows the contacting of the switch element 13. FIG. 5C shows the locking of the piston element 13 by means of the second latching pawl 18.

The actuation of the switch element 13 increases the amount of air in the air spring 3, as a result of which the seat height h of the vehicle seat increases. The switch element 13 is actuated as long as the piston element 10 is locked by the second latching pawl 18. By increasing the amount of air and increasing the seat height h, the piston element 10 is displaced with respect to the rod element 11. The lock is released when the second functional region portion 20 has been passed by means of the displacement of the piston element 10 and is no longer in contact with the latching pawl 18, the piston element being returned to the zero position by the actuating element, which is described in greater detail in further figures. If the lock is released and the piston element 10 is rotated back to the zero position, that is, the seat height h is in the normal range, it is still possible to continue manually operating the switch element 13 because of the configuration of the first functional region.

Figure 6A:
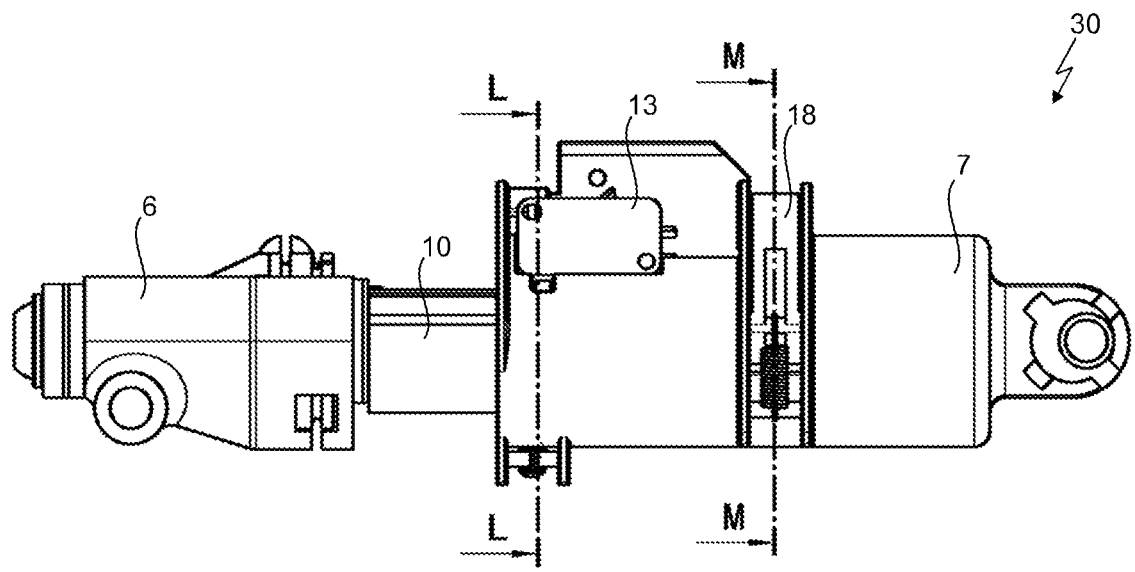
FIG. 6A shows the residual spring travel controller in the normal range.
Figure 6B:
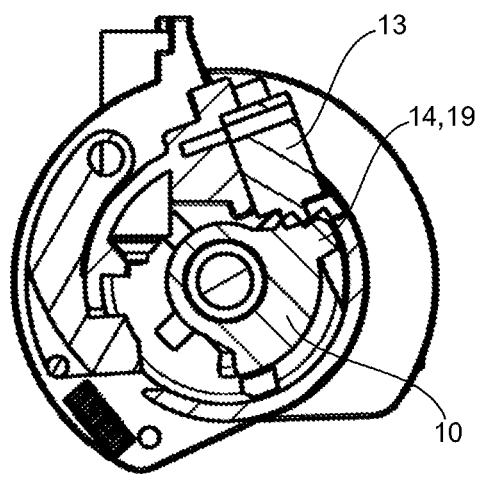
FIG. 6B shows a section of the residual spring travel controller according to FIG. 6A.
Figure 6C:
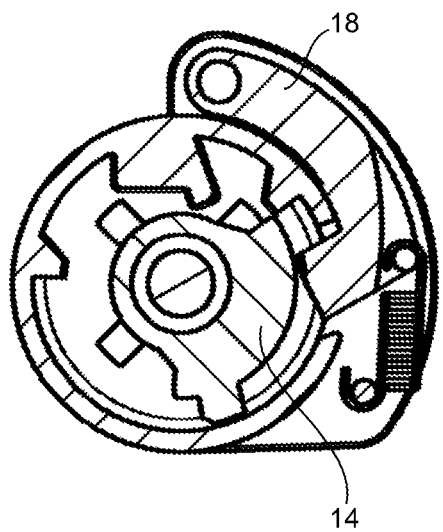
FIG. 6C shows another section of the residual spring travel controller according to FIG. 6A.

Such a manual actuation of the switch element 13 can be seen in FIGS. 6A to 6C. The residual spring travel controller 2 is in the normal range 30 and the piston element 30 can be removed from the zero position.

Upon actuation in the normal range 30, the first functional region portion 19 is in contact with the switch element 13, but no locking of the piston element 10 can be seen, as illustrated in FIG. 6C. This is provided in this way due to the design of the first functional region 14.

In particular, FIGS. 6A to 6C show manual upward adjustments, that is to say that the seat height h of the vehicle seat is supposed to be increased.

Figure 7A:
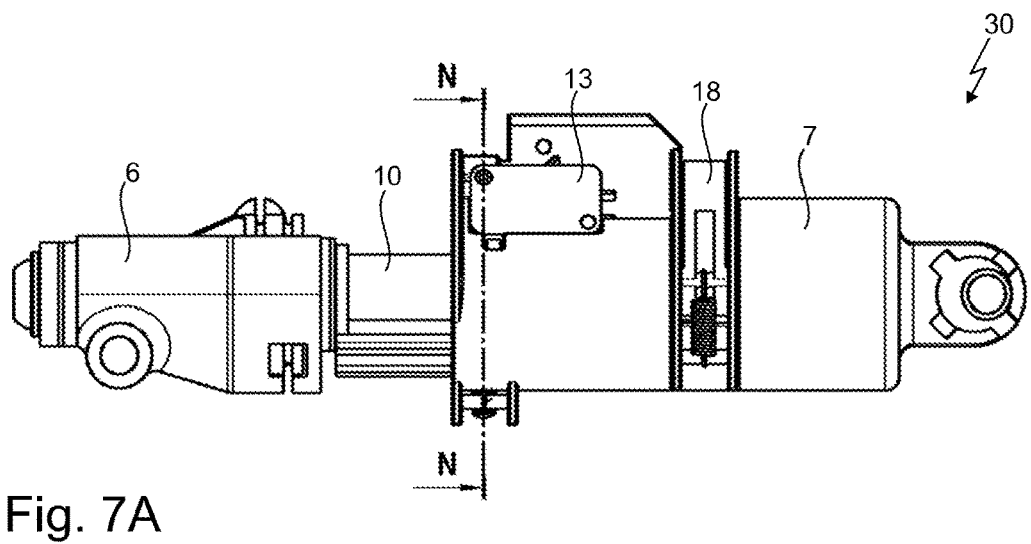
FIG. 7A shows the residual spring travel controller in the normal range.
Figure 7B:
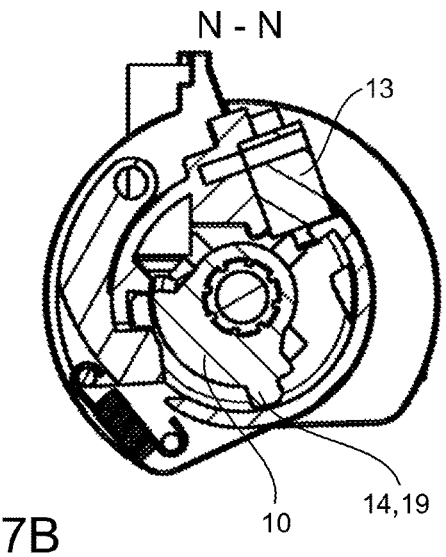
FIG. 7B shows a section of the residual spring travel controller according to FIG. 7A.

FIGS. 7A and 7B show manual downward adjustments, that is to say that the seat height h of the vehicle seat is supposed to be decreased.

For this purpose, the piston element 10 is in contact with the valve element 12 by means of the second functional region 15 and, in particular, by means of the first functional region portion 21, as a result of which air can be discharged from the air spring 3. Because the seat height h is in the normal range, no locking of the piston element 10 by means of the first latching pawl 17 is provided.

Figure 8A:
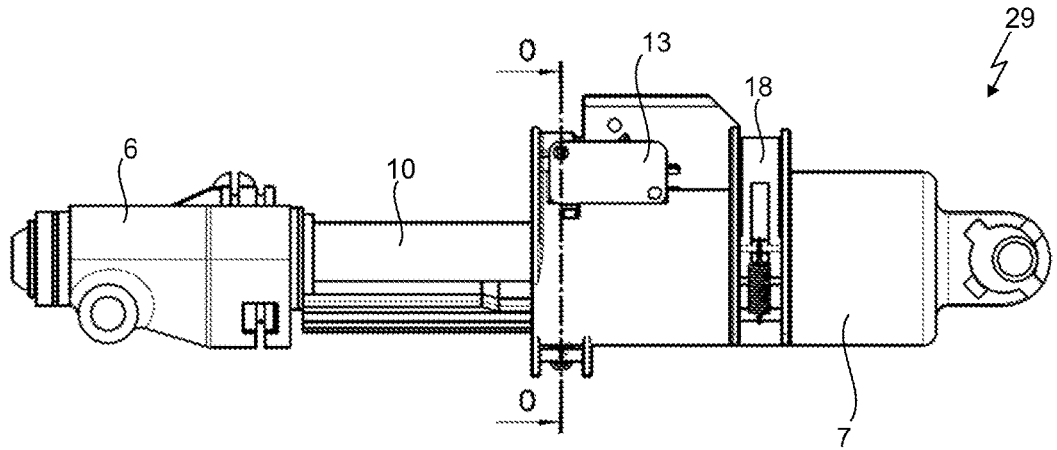
FIG. 8A shows the residual spring travel controller in the upper residual spring travel range.
Figure 8B:
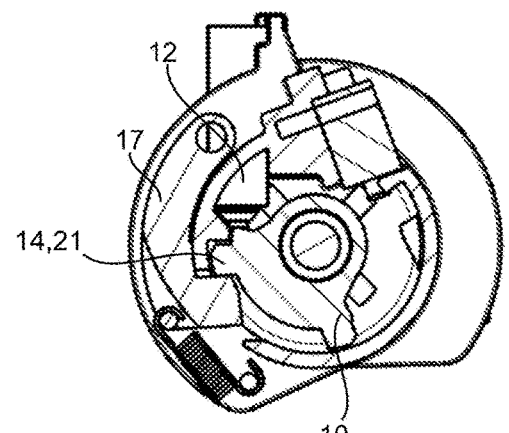
FIG. 8B shows a section of the residual spring travel controller according to FIG. 8A.

In FIGS. 8A and 8B, the seat height h is in the upper residual spring travel range 29, that is, the seat height h is too high and not enough upward spring travel is available. As a result of the actuation of the residual spring travel controller 2, the piston element 10 is rotated and brought into contact with the valve element 12 by means of the second functional region 15 and, in particular, by means of the first functional region portion 21, the piston element 10 also being locked by the second functional region portion 22 and the first latching pawl 17.

Figure 9:
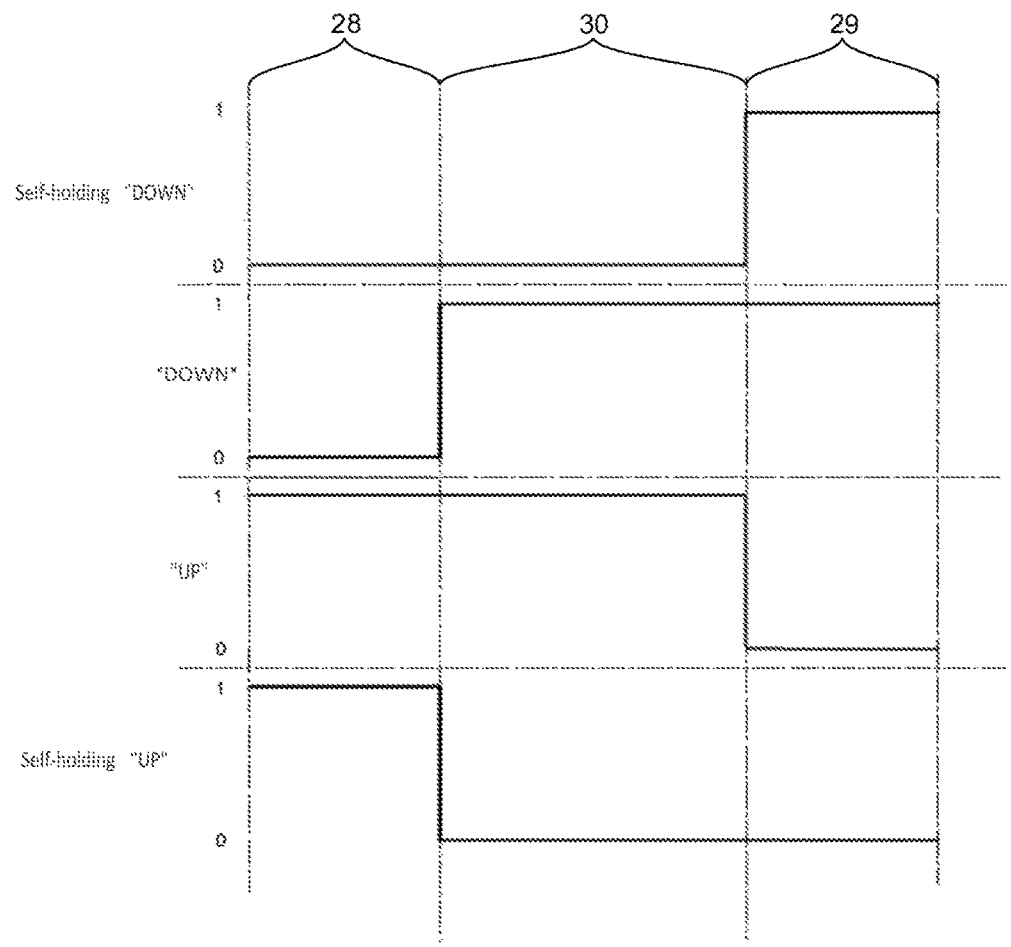
FIG. 9 shows a functional diagram.

FIG. 9 shows the operating principle of the overview as a functional diagram, the possible seat heights h being represented by the lower residual spring travel range 28, the upper residual spring travel range 29 and the normal range 30.

The term "self-holding DOWN" refers to the fact that the seat height h is too high and the piston element 10 is therefore locked with the valve element 12 and the first latching pawl 17 following actuation, as a result of which air can escape from the air spring and the seat height h is decreased as long as the piston element 10 is locked.

The term "self-holding UP" refers to the fact that the seat height h is too low and the piston element 10 is therefore locked with the switch element 13 and the second latching pawl 18 following actuation, as a result of which air can flow into the air spring and the seat height h is increased as long as the piston element 10 is locked.

The term "DOWN" describes the positions in which activation of the valve element 12 is possible.

The term "UP" describes the positions in which activation of the switch element 13 is possible.

Furthermore, "1" denotes activated and "0" denotes deactivated.

The following should be ensured here: If the seat height h is in the lower residual spring travel range 28 or in the upper residual spring travel range 29, then the piston element 10 is locked and in contact with the valve element 12 or the switch element 13. This is represented by the fact that the lock is active and the valve element 12 or the switch element 13 correspondingly is as well. If the seat height is in the normal range 30, no locking of the piston element 10 is provided such that the residual spring travel controller 2 can be actuated manually. This is represented by the fact that the valve element 12 or the switch element 13 is designated by "1" in the normal range 30.

In FIGS. 10A to 10E, the actuating element 31 is shown in greater detail and its operation is considered in greater detail.

The actuating element 31 comprises a base body 85 and an actuating element lever 86 that is connected to the base body 85 so as to be rotatable about a third axis of rotation 86.

Furthermore, a first Bowden cable 32 and a second Bowden cable 33 are provided that are connected on the one hand to a first end of the rotary body 49 and on the other hand to the actuating element 31.

In this case, the Bowden cables 32, 33 are connected to the rotary body in such a way that, upon upward actuation of the actuating element 31, the rotary body 49 is rotated in one direction and, upon downward actuation of the actuating element 31, the rotary body 49 is rotated in a corresponding other direction.

Likewise, the Bowden cables 32, 33 are connected to the actuating element 31 in such a way that, upon upward actuation of the actuating element 31, the first Bowden cable 32 transmits a pull to the rotary body 49 and, upon downward actuation of the actuating element 31, the second Bowden cable 33 transmits a pull to the rotary body 49. The exact arrangement of the Bowden cables 32, 33 with respect to the actuating element 31 is shown in greater detail in the following figures.

The base body 85 can be arranged laterally on the vehicle seat or centrally at the front of the vehicle seat.

Figure 10A:
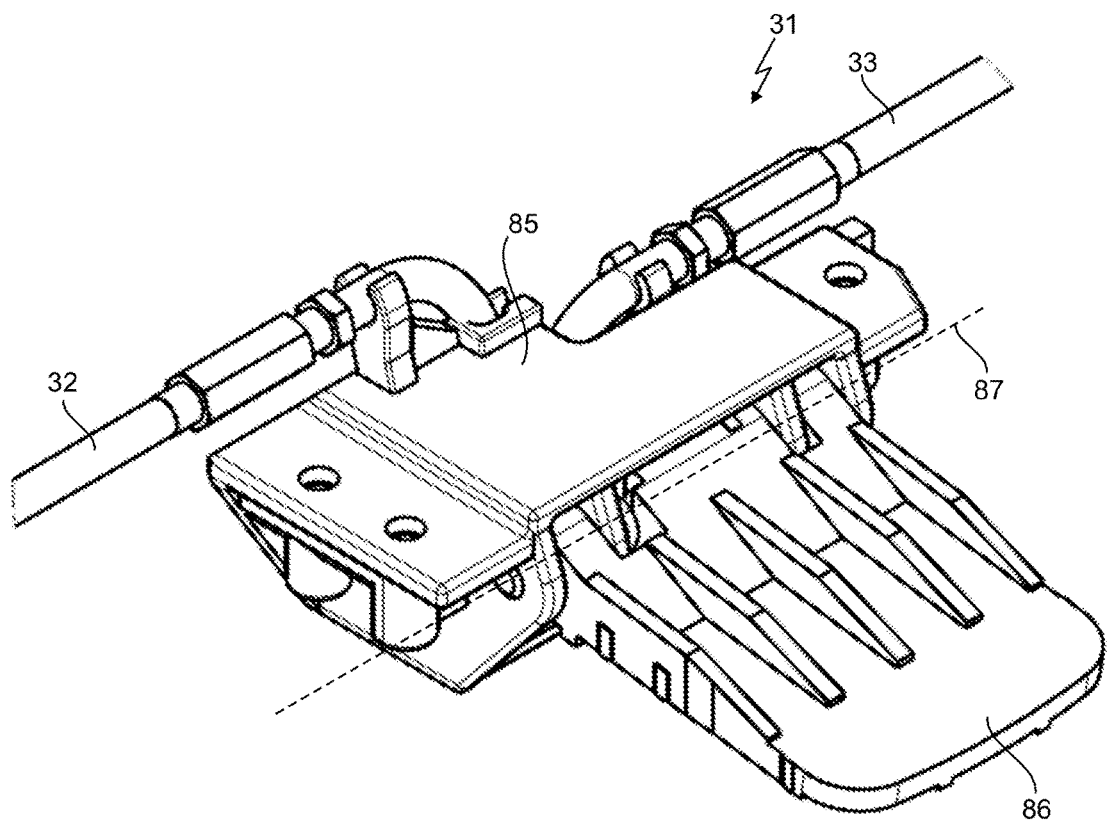
FIG. 10A is a perspective view of an actuating element according to one embodiment.
Figure 10B:
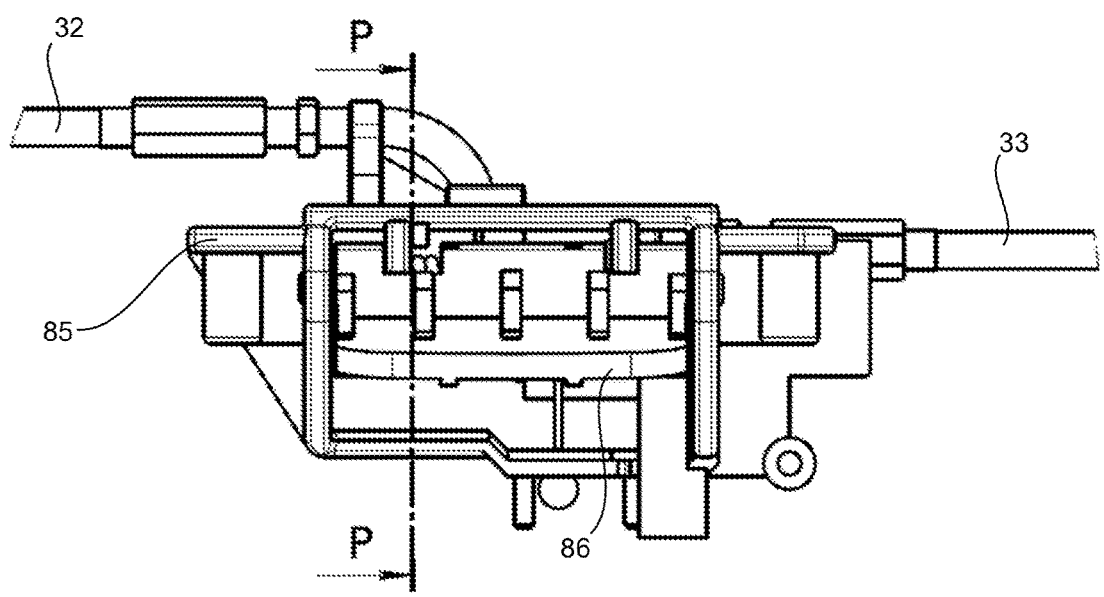
FIG. 10B shows a front view of the actuating element according to FIG. 10A.
Figure 10C:
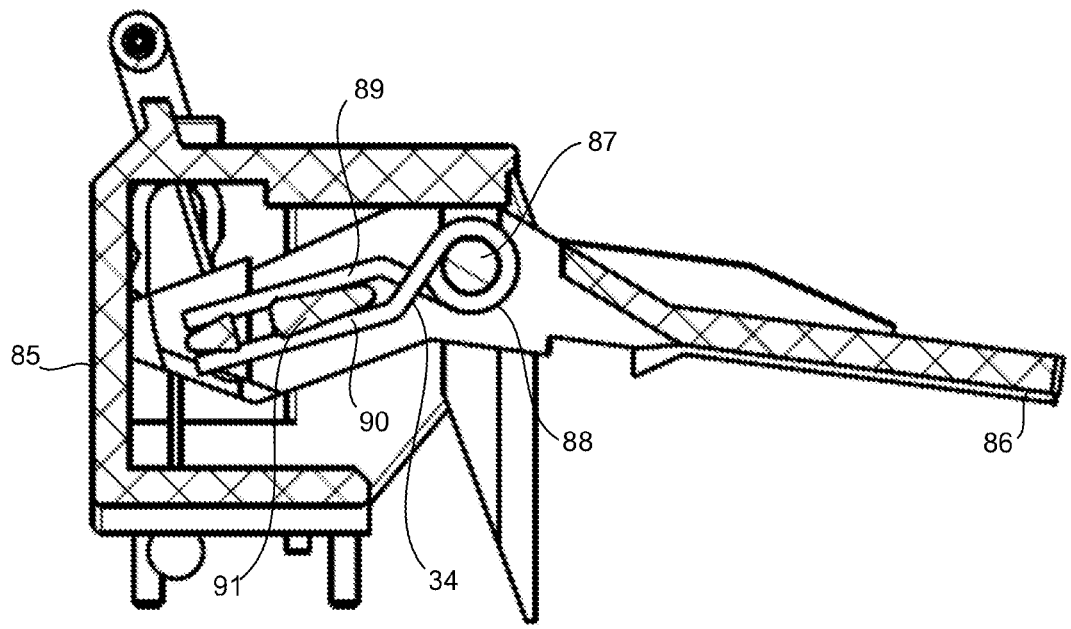
FIG. 10C shows a section of the actuating element according to FIG. 10B.

FIG. 10B shows a front view of the actuating element 31.

FIG. 100 shows a section along the line P-P of FIG. 10B. As can be seen, the actuating element lever 86 is connected to the base body 85 so as to be rotatable about the third axis of rotation 87. Furthermore, the return spring 34 is provided such that the return spring 34 is connected on the one hand to the base body 85 and on the other hand to the actuating element lever 86.

Preferably, the return spring comprises a spring head 88 as well as a first leg 89 and a second leg 90. Particularly preferably, the spring head 88 is rigidly connected to the base body 85 and the legs 89, 90 are in contact with a contacting element 91 of the actuating element lever 86. Upon upward or downward actuation of the actuating element lever 86, the actuating element lever 86 is correspondingly rotated about the third rotational axis 87 such that the contacting element 91 also undergoes a rotation. Due to the rotation of the contacting element 91 and due to the fact that the legs 89, 90 are in contact with the contacting element 91 in the zero position 35, i.e., in the non-rotated position, the corresponding leg 89, 90 of the return spring 34 is deflected, thus generating a restoring force.

Upon downward actuation of the actuating element lever 86, the contacting element 91 moves up, thereby deflecting the first leg 89. Upon upward actuation of the actuating element lever 86, the contacting element 91 moves down, thereby deflecting the second leg 90.

Because of the restoring force generated thereby, the actuating element lever 86 is returned to the zero position 35 after the actuating element lever 86 is released, which also means that the piston element 10 is rotated back to its zero position if the piston element 10 is not locked. After the lock is released, the piston element 10 is then rotated back to the zero position if the actuating element 31 is not actuated further.

Figure 10D:
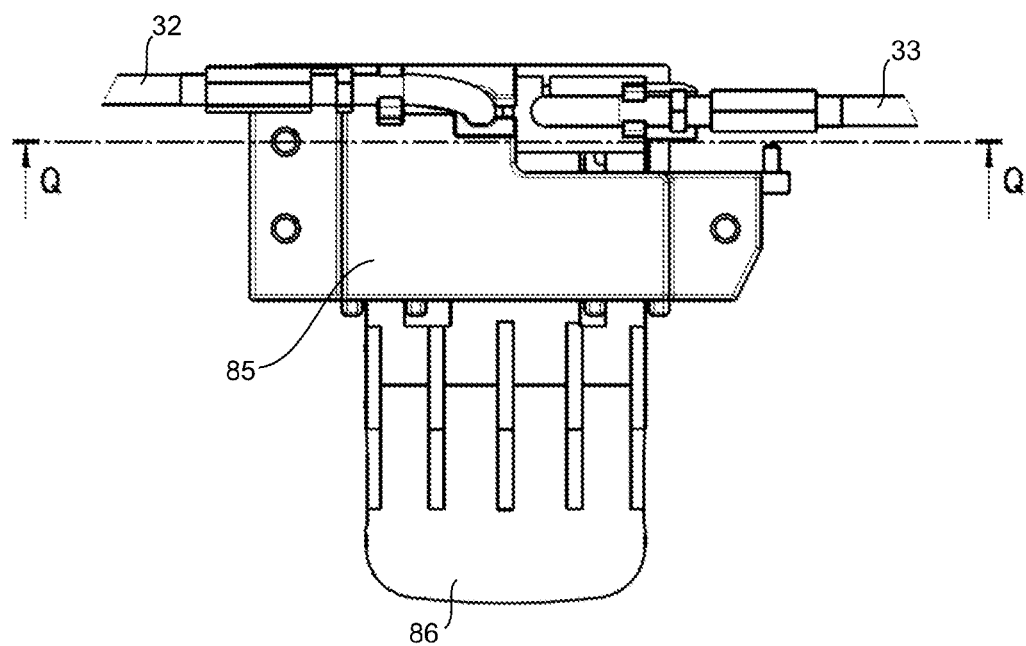
FIG. 10D shows a plan view of the actuating element according to FIG. 10A.

FIG. 10D shows the actuating element 31 in a plan view.

Figure 10E:
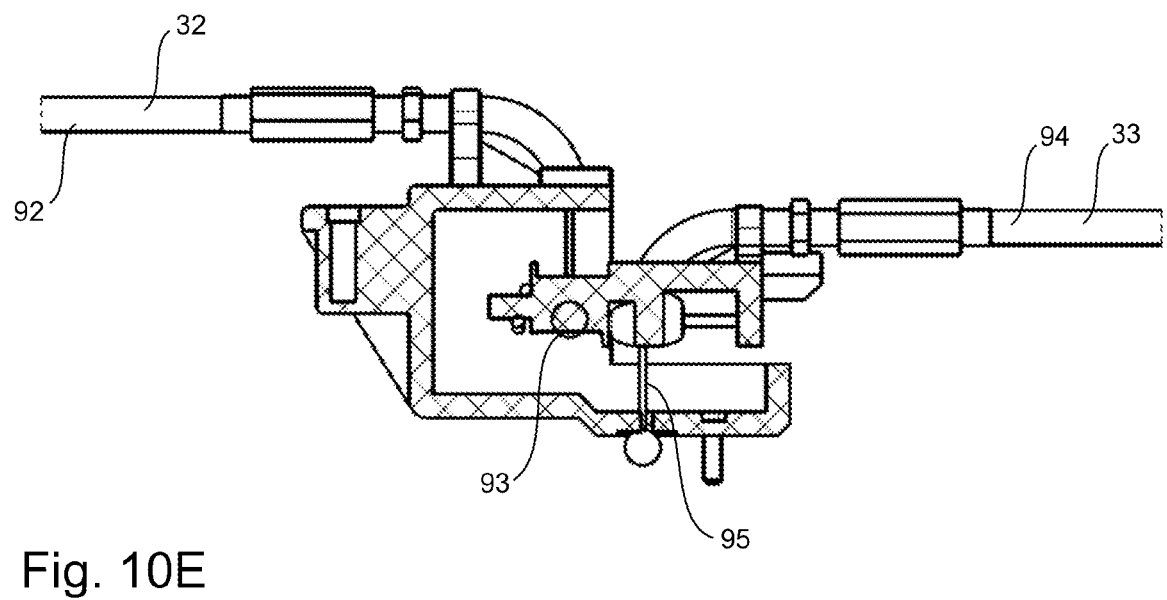
FIG. 10E shows a section of the actuating element according to FIG. 10D.

FIG. 10E shows a section along the line Q-Q of FIG. 10D. It can be seen in this case that the first Bowden cable 32 has a first shell 92 and a first control cable element 93 and the second Bowden cable 33 has a second shell 94 and a second control cable element 95.

In this case, the first control cable element 93 is fixedly connected to the actuating element lever 86 such that upon upward actuation of the actuating element lever 86, the first control cable element 93 is pulled down, as a result of which a pull is transmitted to the rotary body 49. When the actuating element lever 86 is moved down, the first control cable element 93 is not moved. The first shell 92 is rigidly connected to the housing or the base body 85.

The second control cable element 95, however, is fixedly connected to the base body 85 and the second shell 94 is rigidly connected to the actuating element lever 86. Upon downward actuation, the second shell 94 is moved in such a way that a pull is exerted on the base body.

All the features disclosed in the application documents are claimed as being essential to the invention, provided that, individually or in combination, they are novel over the prior art.

LIST OF REFERENCE SIGNS

1 Vehicle seat
2 Residual spring travel control
3 Air spring
4 First connecting link
5 Second connecting link
6 First end of the residual spring travel controller
7 Second end of the residual spring travel controller
8 First end of the air spring
9 Second end of the air spring
10 Piston element
11 Rod element
12 Valve element
13 Switch element
14 First functional region
15 Second functional region
16 Air conveying unit
17 First latching pawl
18 Second latching pawl
19 First functional region portion of the first functional region
20 Second functional region portion of the first functional region
21 First functional region portion of the second functional region
22 Second functional region portion of the second functional region
23 First distance
24 First length of the first functional region portion of the first functional region
25 Second length of the second functional region portion of the first functional region
26 First length of the first functional region portion of the second functional region
27 Second length of the second functional region portion of the second functional region
28 Lower residual spring travel range
29 Upper residual spring travel range
30 Normal range
31 Actuating element
32 First Bowden cable
33 Second Bowden cable
34 Return spring
35 Zero position
36 Lower part 37 Upper part
38 Damper
39 First spring element
40 Second spring element
41 First fastening eye
42 Second fastening eye
43 Receptacles
44 First axis of rotation
45 Second axis of rotation
46 Slide bush
47 First slide bush
48 Second slide bush
49 Rotary body
50 Third slide bush
51 Fourth spacer element
52 Screw
53 Shaft part
54 First opening
55 Functional body part
56 Second opening
57 First Bowden cable receptacle
58 Second Bowden cable receptacle
59 Transition region
60 First portion
61 Second portion
62 First circle
63 Second circle
64 Receptacle of the rotary body
65 First end face
66 Length of the first functional region portion
67 Length of the second functional region portion
68 First tapered region
69 Second tapered region
70 Proportion
71 Further proportion
72 Second end face
73 Third tapered region
74 Fourth tapered region
75 Length of the first functional region portion
76 Length of the second functional region portion
77 First connection region
78 Second connection region
79 Curved portion
80 Straight portion
81 Third opening
82 Fourth opening
83 Interior
84 Distance
85 Base body
86 Actuating element lever
87 Third axis of rotation
88 Spring head
89 First leg
90 Second leg
91 Contacting element
92 First shell
93 First control cable element
94 Second shell
95 Second control cable element
ER Extension direction

What is claimed is:

1. A vehicle seat comprising a residual spring travel controller and an air spring, the residual spring travel controller and the air spring each having a first end that is connected to a first connecting link of the vehicle seat and each having a second end that is connected to a second connecting link of the vehicle seat, and the residual spring travel controller comprising a piston element that is connected to the first end of the residual spring travel controller and a rod element that is connected to the second end of the residual spring travel controller,
wherein the piston element is brought into contact with a valve element or a switch element by at least one of a rotary movement or a sliding movement with respect to the rod element to adjust an amount of air of the air spring.

2. The vehicle seat according to claim 1, wherein the piston element comprises a first functional region and a second functional region, and wherein the first functional region can contact the switch element and the second functional region can contact the valve element based on an angular position and a longitudinal position of the piston element relative to the rod element.

3. The vehicle seat according to claim 1, wherein the switch element actuates an air conveying unit that conveys air into the air spring, and wherein the valve element allows air to escape from the air spring.

4. The vehicle seat according to claim 1, wherein a first latching pawl and a second latching pawl are arranged on the second end of the residual spring travel controller, and wherein the first latching pawl can lock a first functional region and the second latching pawl can lock a second functional region with respect to a rotation of the piston element.

5. The vehicle seat according to claim 4, wherein the first functional region comprises a first functional region portion and a second functional region portion, wherein the first functional region portion can contact the switch element, and wherein the second functional region portion can contact the second latching pawl.

6. The vehicle seat according to claim 4, wherein the second functional region comprises a first functional region portion and a second functional region portion, wherein the first functional region portion can contact the valve element, and wherein the second functional region portion can contact the first latching pawl.

7. The vehicle seat according to claim 4, wherein the first latching pawl and the second latching pawl are spaced apart from each other at a first distance in an extension direction of the rod element.

8. The vehicle seat according to claim 5, wherein the first functional region portion of the first functional region has a first length and the second functional region portion of the first functional region has a second length as seen in an extension direction of the piston element.

9. The vehicle seat according to claim 6, wherein the first functional region portion of the second functional region has a first length and the second functional region portion of the second functional region has a second length as seen in an extension direction of the piston element.

10. The vehicle seat according to claim 2, further comprising a lower residual spring travel range, and an upper residual spring travel range, and a normal range of the vehicle seat arranged between the lower and the upper residual spring travel range, wherein the first functional region can contact the switch element through a rotation of the piston element when the vehicle seat is in the lower residual spring travel range, and wherein the second functional region can contact the valve element through a rotation of the piston element when the vehicle seat is in the upper residual spring travel range.

11. The vehicle seat according to claim 1, wherein an actuating element actuates the residual spring travel controller, wherein a first end of a first Bowden cable and a first end of a second Bowden cable are connected to the actuating element, and wherein a second end of the first Bowden cable and a second end of the second Bowden cable are connected to the piston element.

12. The vehicle seat according to claim 11, wherein upon actuation of the actuating element in a first direction, the first Bowden cable transmits a pull to the piston element to rotate the piston element to the right or to the left, and wherein the second Bowden cable transmits a pull to the piston element to rotate the piston element to the left or to the right in the corresponding other direction upon actuation of the actuating element in a second direction.

13. The vehicle seat according to claim 11, wherein the actuating element comprises a return spring for automatically returning the actuating element to a zero position following an actuation.

14. A method for operating the vehicle seat and the residual spring travel controller according to claim 1, the method comprising:
   actuating the residual spring travel controller;
   extending, depending on a position of the piston element relative to the rod element, the residual spring travel controller from a lower residual spring travel range or from an upper residual spring travel range to a normal range; and
   setting a height of the vehicle seat in the normal range.

15. The vehicle seat according to claim 2, wherein a first latching pawl and a second latching pawl are arranged on the second end of the residual spring travel controller, and wherein the first latching pawl can lock a first functional region and the second locking pawl can lock a second functional region with respect to a rotation of the piston element.

16. The vehicle seat according to claim 15, wherein the first functional region comprises a first functional region portion and a second functional region portion, wherein the first functional region portion can contact the switch element, and wherein the second functional region portion can contact the second latching pawl.

17. The vehicle seat according to claim 16, wherein the first functional region portion of the first functional region has a first length and the second functional region portion of the first functional region has a second length as seen in an extension direction of the piston element.

18. The vehicle seat according to claim 2, wherein the switch element actuates an air conveying unit that conveys air into the air spring, and wherein the valve element allows air to escape from the air spring.

19. The vehicle seat according to claim 18, wherein a first latching pawl and a second latching pawl are arranged on the second end of the residual spring travel controller, and wherein the first latching pawl can lock a first functional region and the second locking pawl can lock a second functional region with respect to a rotation of the piston element.

20. The vehicle seat according to claim 3, wherein a first latching pawl and a second latching pawl are arranged on the second end of the residual spring travel controller, and wherein the first latching pawl can lock a first functional region and the second locking pawl can lock a second functional region with respect to a rotation of the piston element.

* * * * *